United States Patent [19]

Coulson

[11] Patent Number: 4,997,264

[45] Date of Patent: Mar. 5, 1991

[54] FERROELECTRIC LIQUID CRYSTAL DEVICES HAVING A HIGH SURFACE TILT

[75] Inventor: Ian Coulson, Middlesex, England

[73] Assignee: The Secretary of State for Defence in Her Britannic Majesty's Government of the United Kingdom of Great Britain and Northern Ireland, London, England

[21] Appl. No.: 279,554

[22] Filed: Dec. 1, 1988

[30] Foreign Application Priority Data

Apr. 3, 1986 [GB] United Kingdom ............... 8608116

[51] Int. Cl.$^5$ .............................................. G02F 1/13
[52] U.S. Cl. ............................... 350/350 S; 350/341; 350/346
[58] Field of Search ................. 350/341, 333, 350 S, 350/337, 335, 336, 346; 340/784

[56] References Cited

U.S. PATENT DOCUMENTS

| | | | |
|---|---|---|---|
| 4,084,884 | 4/1978 | Raynes | 350/341 |
| 4,291,948 | 9/1981 | Crossland et al. | 350/341 |
| 4,394,069 | 7/1983 | Kaye | 350/335 X |
| 4,548,476 | 10/1985 | Kaneko | 350/350 S |
| 4,563,059 | 1/1986 | Clark et al. | 350/350 S |
| 4,586,791 | 5/1986 | Isogai et al. | 350/341 |
| 4,615,586 | 10/1986 | Geary et al. | 350/350 S |
| 4,634,228 | 1/1987 | Iwasaki et al. | 350/341 |
| 4,664,480 | 5/1987 | Geary et al. | 350/350 S X |
| 4,707,078 | 11/1987 | Geary | 350/350 S X |
| 4,709,994 | 12/1987 | Kanbe et al. | 350/341 X |
| 4,712,873 | 12/1987 | Kanbe et al. | 350/337 |
| 4,714,323 | 12/1987 | Katagiri et al. | 350/341 |
| 4,722,594 | 2/1988 | Crossland et al. | 350/350 S |

FOREIGN PATENT DOCUMENTS

| | | | |
|---|---|---|---|
| 0092181 | 10/1983 | European Pat. Off. | 350/333 |
| 0164814 | 12/1985 | European Pat. Off. | 350/350 S |
| 0179592 | 4/1986 | European Pat. Off. | 350/350 S |
| 2567533 | 1/1986 | France | 350/350 S |
| 1454296 | 11/1976 | United Kingdom . | |
| 2163273A | 2/1986 | United Kingdom | 350/350 S |

OTHER PUBLICATIONS

D. Armitage–"Alignment of Liquid Crystals on Obliquely Evaporated Silicon Oxide Films", J. Appl. Phys. 51(5), May 1980–pp. 2552–2555.

Uemura et al., "Alignment of Chiral Smectic C Liquid Crystal by Oblique Evaporation Method", Japan Display 86–Oct. 86–pp. 464–467.

Applied Physics Letters 47(1985) Dec., No. 12, pp. 1277–1279, "Room–Temperature Switching . . . " European Search Report.

Primary Examiner—Stanley D. Miller
Assistant Examiner—Tai V. Duong
Attorney, Agent, or Firm—Nixon & Vanderhye

[57] ABSTRACT

A liquid crystal display device with a fast switching time and bistability comprises a layer of a chiral smectic material between cell walls. Electrodes on the walls allow the material to be switched between two states by application of positive and negative voltage pulses. Rapid switching is due to the ferro electric effect. Good alignment and uniformity of display is achieved by using an alignment giving a high, 5°–45°, tilt to the liquid crystal molecules. Alignment may be provided by oblique evaporate of silicon monoxide at a glancing angle of up to 15°.

18 Claims, 3 Drawing Sheets

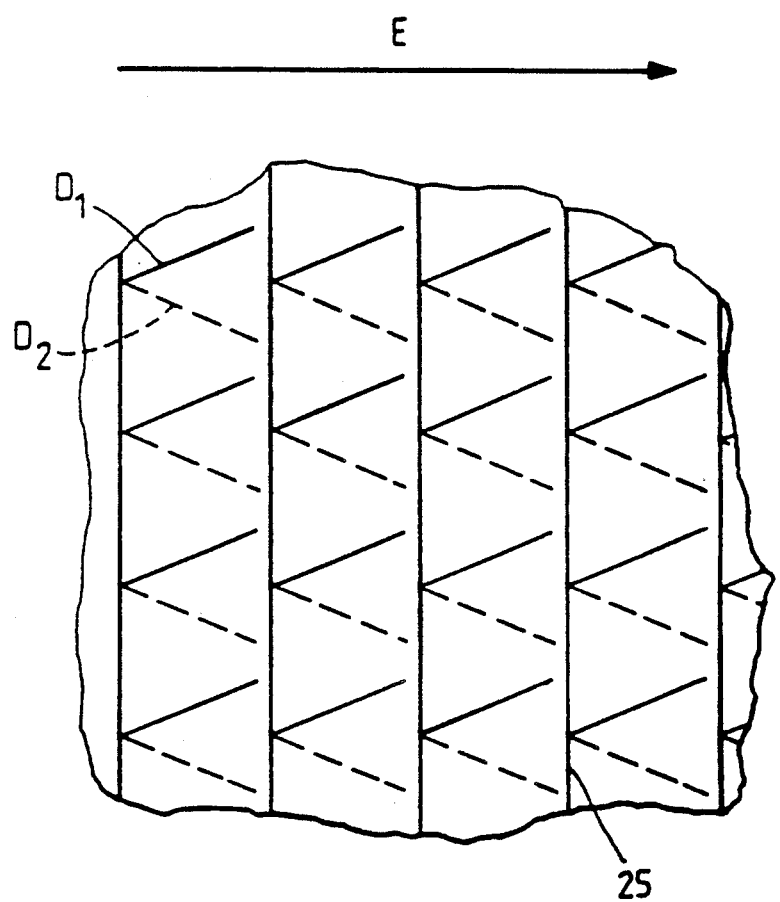

FERROELECTRIC LIQUID CRYSTAL DEVICES HAVING A HIGH SURFACE TILT

This application is a continuation of PCT application PCT/GB87/00220 filed Apr. 1, 1987 claiming priority from British application 86 08116 filed Apr. 3, 1986.

The invention relates to smectic liquid crystal devices employing ferro electric smectic material.

Liquid crystal devices commonly comprises a thin layer of a liquid crystal material contained between two glass plates or walls. A thin transparent electrode is deposited on the inner face of both walls. The combination of liquid crystal layer, walls, and electrode is often termed a liquid crystal cell. When an electric field is applied between the two electrodes, liquid crystal molecules rotate in the field to an ON state. On removal of the field the molecules rotate back to an OFF state, determined by a surface treatment applied to the walls before cell assembly and by the type of liquid crystal material. The optical transmission characteristics of the ON and OFF states are different. Some devices need one or two polarisers and/or dyes to visibly distinguish between ON and OFF states.

There are broadly three different phases of liquid crystal material, nematic, cholesteric, and smectic, each distinguished by a different molecular ordering.

Such materials only show a liquid crystal phase over a limited temperature range between the solid and isotropic liquid phases. Within the liquid crystal phase temperature range a material may exhibit one or more of the nematic, cholesteric or smectic phase types. Normally a material is chosen such that it forms only one type of liquid crystal phase over its working temperature range.

The present invention concerns devices using ferroelectric smectic liquid crystal materials.

Displays have been made with the electrodes formed into rows on one wall and columns on the other wall. These collectively form an x, y matrix of separately addressable elements on a large display. One way of addressing such a display is by multiplexing i.e. addressing each row in sequence until the whole display has been addressed. This is repeated all the time that a display is needed. Another type of display uses the ON and OFF states to form an electrically switchable optical shutter. Yet another type of display is used as an optical storage device. Nematic cholesteric and smectic liquid crystal material have been used for such devices. A problem with many displays is the time taken to switch between the two states i.e. the response times. For many displays a fast response time is needed. A nematic material, arranged in a 90° twisted structure typically has a response time of 100 milliseconds.

Devices comprising smectic materials have not been used as widely as devices with nematic or cholesteric materials. Available display devices based on smectic materials do not have the necessary characteristics. Recently however the smectic ferro-electric property with its fast switching and bistability characteristics has become important see for example N. A. Clark & S. T. Lagerwall, App. Phys. Letters 36(11) 1980 pp 899–901. Chiral materials in a tilted liquid crystal smectic phase, e.g. $S_C^*$, $S_I^*$, $S_F^*$, $S_J^*$, $S_G^*$ $S_H^*$, are known to exhibit ferro-electric properties. This has been described by R. B. Meyer, L. Liebard, L. Strzelecki, and P. Keller, J. de Physique (Lett.), 36, L-69 (1975).

A disadvantage of the devices using ferro-electric or chiral smectic (S*) materials is the non-uniformity of cells: they appear patchy. One particular kind of problem that arises in cells using a conventional alignement layer, such as a rubbed polyimide material as used in twisted nematic devices, is characterised by a "zig zag" defect, which is visible under microscopic examination and separates areas of the cell which exhibit different levels of contrast and angle of view. This produces an unacceptable visual appearance for a display or shutter using the smectic C material.

According to this invention the above problem is solved by using a cell wall surface treatment that gives a high tilt to contacting liquid crystal molecules.

According to this invention a liquid crystal device comprises
   two cell walls spaced apart by a spacer,
   a layer of a chiral smectic liquid crystal material contained between the walls,
   electrode structures on the inner facing surfaces of the cell walls,
   a surface alignment coating on the inner facing surface of at least one wall, the alignment coating providing both an alignment direction and a surface tilt of above 5° to contacting liquid crystal material
   at least one polariser arranged with its optical axis parallel to a liquid crystal molecular alignment direction,
   and either an amount of a dichroic dye in the liquid crystal material or a second polariser arranged so that the cell walls are between both polarisers.

The alignment directions on the two walls may be parallel in the same or opposite directions, although small variations are acceptable.

A retarder may be incorporated between the polarisers to optimise colour and contrast.

A reflector may be used and the device viewed in reflected light, in which case the second polariser may be replaced by a retarder between the cell and the reflector.

The chiral smectic material has a cholesteric phase at a temperature above ambient between the smectic and isotropic phases. Preferably the cholesteric pitch p is greater than half the layer thickness d over a temperature range of 0.1° C. or more above the smectic/cholesteric phase transition. The value of the spontaneous polarisation co-efficient Ps of the material is at least 0.1 and preferably 1 or more nC/cm².

The liquid crystal material is heated into the isotropic phase and introduced between the walls by capillary action via two holes which are subsequently sealed, or by vacumn filling through a single hole. Once in place the liquid crystal material is heated into the cholesteric phase and slowly cooled to ambient temperature. This assists in obtaining good alignment and uniform appearance. A typical cooling rate is between 0.05° and 2° C./minute within ±5° C. of the smectic/cholesteric phase transition.

BRIEF DESCRIPTION OF THE DRAWINGS

One form of the invention will now be described, by way of example only, with reference to the accompanying drawings in which:

FIG. 3 is an enlarged view of part of FIG. 1;

Ambient temperatures may be taken as 0° C. to 40° C. for most displays. However for displays mounted on instruments or other equipment ambient operating temperature may reach 100° C.

DESCRIPTION OF PREFERRED EMBODIMENT

Figure 1:
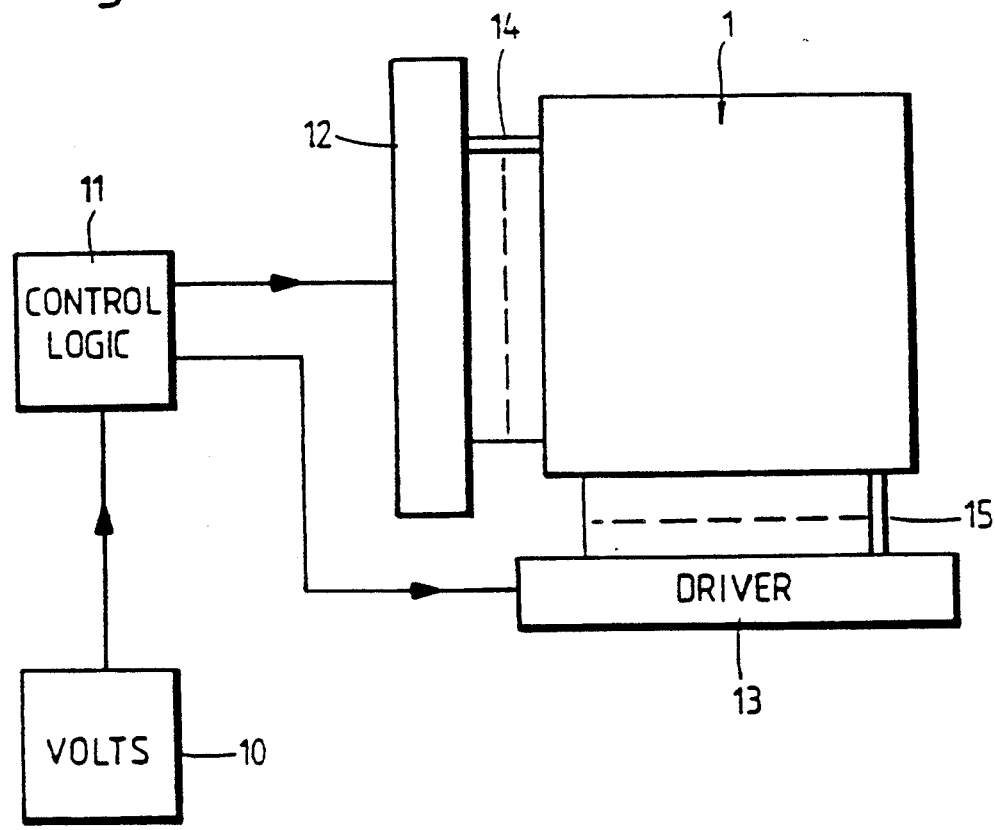
FIGS. 1, 2, are plan and section views of a liquid crystal display device.
Figure 2:
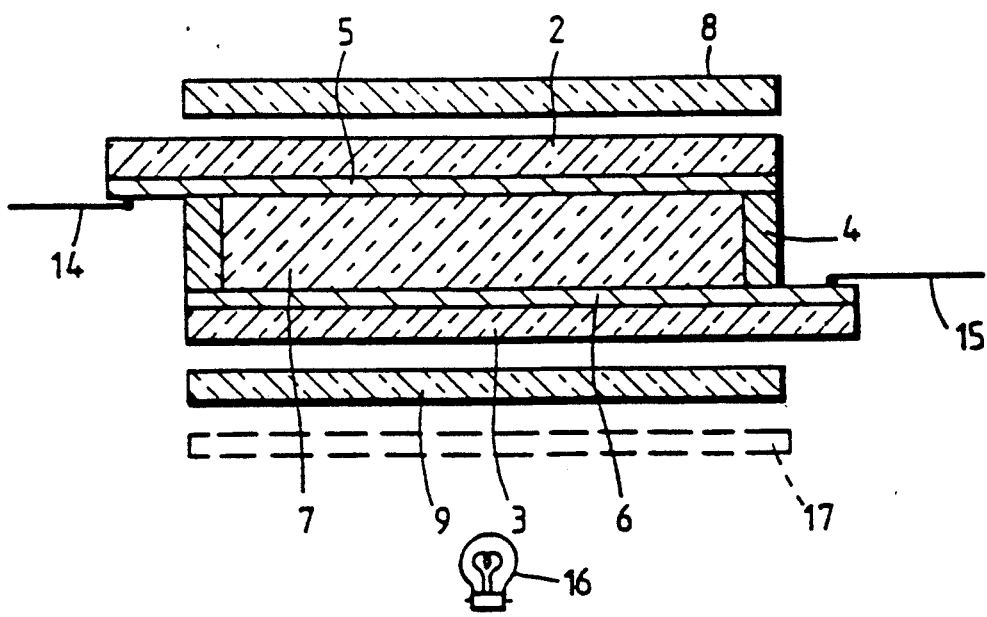

The cell 1 shown in FIGS. 1, 2, 3 comprises two glass walls 2, 3, spaced about 2–15 μm apart by a spacer ring 4 and/or distributed spacers. Electrode structures 5, 6 of transparent tin oxide are formed on the inner face of both walls. These electrodes may be of conventional row (x) and column (y) shape, radius and angle (r, θ) shape, or seven or more segment display for displaying alpha numerics. A layer 7 of smectic liquid crystal material is contained between the walls 2, 3 and spacer ring 4. Polarisers 8, 9 are arranged in front of and behind the cell 1. A d.c. voltage source 10 supplies power through control logic 11 to driver circuits 12, 13 connected to the electrode structures 5, 6, by lead wires 14, 15.

The cell display may be observed by transmitted light, in which case a light source e.g. a tungsten bulb 16 is arranged behind the display. Alternatively a reflector 17 may be arranged behind the polarisers and the display observed by reflected light. Additionally a retarder (not shown) may be arranged between wall 3 and polariser 9.

Prior to assembly the walls 2, 3 coated with the electrodes 5, 6 are surface treated by the known process of oblique evaporation of silicon monoxide.

This is described for example in G.B. Nos. 1,454,296, 1,472,247, 1,470,592. A stream of silicon monoxide is deposited onto a wall at an angle of up to 15° to the substrate surface. When used as described in the above specification with nematic liquid crystal materials this results in a uniform linear alignment of liquid crystal molecules and a tilt of 30° between the molecules and the wall. The alignment is analogous to rubbing which provides alignment of liquid crystal molecules but a tilt of about 2°. Different angles of molecular tilt may be produced by sequential evaporation of SiO at evaporation angles of up 15. and angles between 15° and 30°. Varying the amounts of material deposited in these two directions varies the tilt angle between about 0° and 45°.

The smectic material is preferably one having a long pitch cholesteric phase above the smectic phase.

Figure 4A:
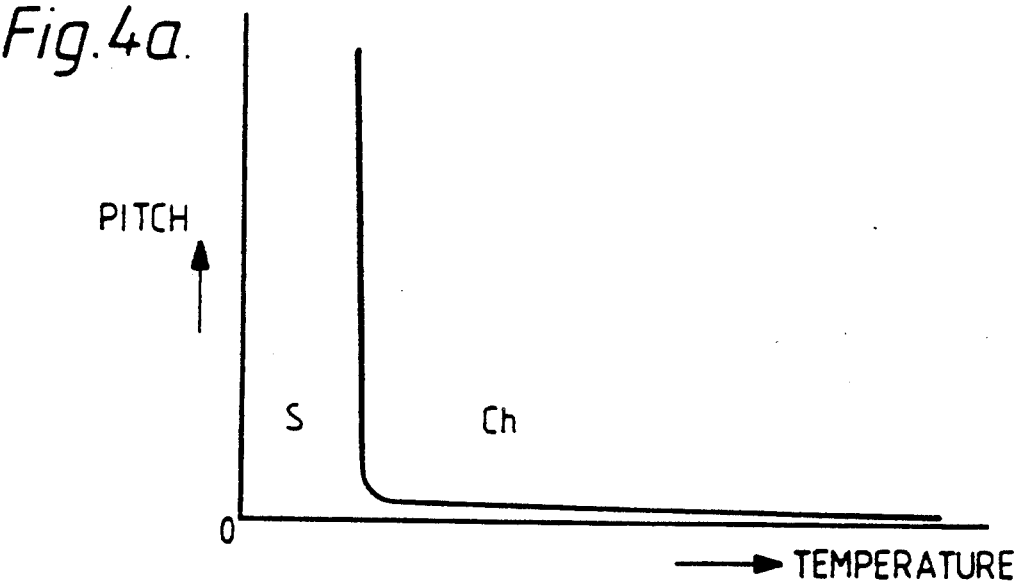
FIGS. 4a, b, c are graphs of cholesteric pitch against temperature for different materials.

To provide a uniform alignment of both molecules 26 and microlayers 25 it is necessary to use a smectic material with a cholesteric phase at elevated temperatures above device operating temperatures e.g. above 40° C. or even 100° C. depending on device use. FIG. 4a shows a cholesteric pitch p versus temperature curve for a typical conventional smectic material with a cholesteric phase. As the temperature reduces very close to a cholesteric/smectic phase transition, pitch p increases towards infinity. Away from this transition cholesteric pitch becomes very small, typically much less than 1 μm.

Displays of the invention described in copending application numbers GB 86 08,114 and 86 08,115 filed together with the present invention have a long pitch in the cholesteric phase for at least 0.1° C. above this phase transition. Preferably this range is 5° C. and ideally occurs over the whole cholesteric temperature range. Within this range the minimum p is greater than 4d, d being the layer thickness.

There are a number of ways of achieving the above material. For example combining one or more chiral components with laevo (left) cholesteric twist sense with one or more chiral components with dextro (right) cholesteric twist sense, with the proviso that none of the laevo components are the racemates of the dextro components. Such a mixture may be used by itself if it has the necessary smectic phases. Alternatively the chiral mixture may be added to a non-chiral or a racemate liquid crystal material, e.g. a smectic C host. Different chiral components may have different temperature/pitch characteristics. In this case it is necessary to ensure that the resultant pitch has the required value in the temperature range above the smectic/cholesteric phase transition.

When using chiral components of opposite twist sense it is necessary to ensure that the resultant mixture has the required spontaneous polarization value Ps. Thus all of the chiral components, regardless of their cholesteric twist sense, may have the same sense of S * polarization, i.e. their Ps add. Alternatively one or more of the chiral components may have the opposite sense of Ps providing the net Ps has a sufficient value.

Another way of achieving the above material is to use one or more chiral components with the same cholesteric twist sense and S * polarisation sense but still satisfying the cholesteric pitch values noted above. Such a mixture may be used alone or in combination with a non-chiral or a racemate liquid crystal material, e.g. a $S_C$ host.

As a result of the long pitch in the cholesteric phase the material cools into the $S_C*$ phase with uniform alignment caused by the cell wall treatment. The result is alignment as in FIG. 3.

The pitch in the smectic phase is arranged to be greater than about 1 μm and preferably very much greater.

Figure 4B:
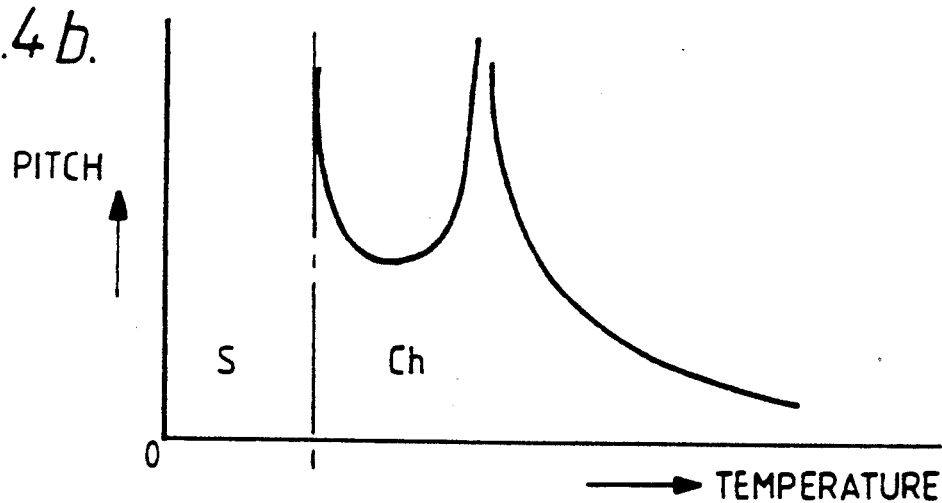
Figure 4C:
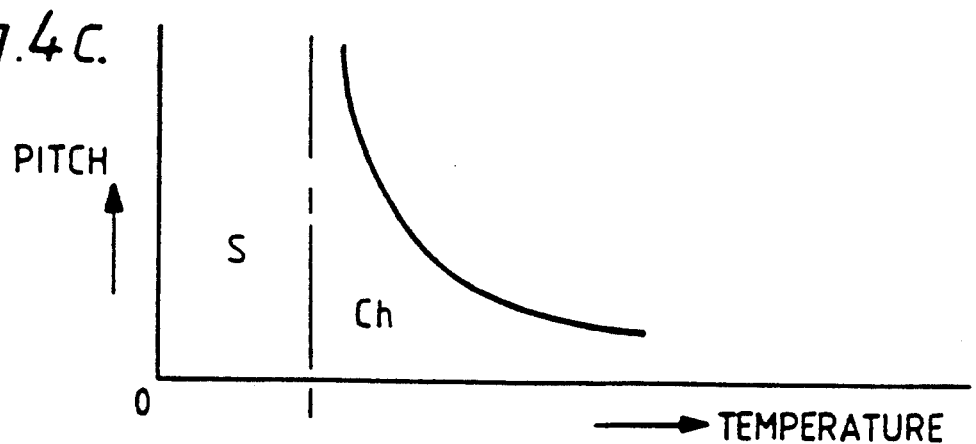

The compensation of pitch in the cholesteric phase is illustrated in FIGS. 4(a), (b), (c). FIG. 4(a) shows cholesteric pitch against temperature for a noncompensated material having a cholesteric to smectic transition. At this transition the pitch tends to infinity. The compensated material shown in FIG. 4(b) shows a pitch increase a few degrees above the transition temperature with a pitch reduction below. By suitable selection of materials this pitch increase can be made to occur even closer to the transition temperature as in FIG. 4(c), but a few degrees difference does not seem to affect the end result.

When introduced into a cell liquid crystal molecules at the cell walls align along the evaporation direction of SiO marked E on FIG. 3 with a surface tilt of e.g. 30°. The directions of E may be the same or in opposite directions on the two walls 2, 3. Liquid crystal molecules are observed to adopt one of two alignment direction D1, D2 depending on the polarity of an applied voltage. A typical voltage is ±10 to 50 volts. These two positions are seen in FIG. 3 in full D1 and broken lines D2, and lie either side of the evaporation/alignment direction E. Rapid switching between the two states, when the d.c. pulses are applied, is due to the smectic ferrc electric property of the material. Typically the cell can be switched between D1 and D2 in times of a few μs to a few ms e.g. 1 ms depending on the liquid crystal material. The two different directions D1, D2 represent two different directions of Ps, often termed UP and DOWN directions. These two directions D1, D2 may be about 45° apart depending on the material composition.

The polarisers 8, 9, FIGS. 1, 2, are arranged with their optical axes crossed. Polariser 8 is aligned with its axis parallel to direction D1. The cell 1 transmits light polarised in a plane parallel to the direction of molecular alignment D1 or D2. Thus in one state D1 of the cell very little light is passed through the combination of polariser 8, cell 1, and polariser 9.

However when the cell is in state D2 the molecules are at 45° to both polarisers 8, 9 optical axis and light is transmitted. Typical applied voltages are ±15 to 20 volts for a 6 μm thick layer of liquid crystal material, ±5 to 10 volts for a 2 μm thick layer, and ± about 30 volts for a 12 μm thick layer.

For the x, y matrix display of FIG. 1 each electrode intersection x, y is addressed by a ± voltage pulse; m, n are integers equal to the number of x and y electrodes respectively. These pulses switch the liquid crystal material at each xn, yn intersection to be light transmissive or opaque as required. Using a known technique of multiplex addressing each intersection is addressed in sequence. Such addressing may be an intersection at a time or a whole x row at a time.

Conventionally an x, y matrix needs to be continually refreshed, i.e. re-addressed, to maintain a flicker free display. The reason for this is that conventional nematic materials quite rapidly relax from one say ON state to say an OFF state. Conventional addressing refreshes each intersection before they have time to turn from ON to OFF. This imposes a severe limitation on the number of x, y intersections that can be addressed.

In contrast cells of this invention possess true bistability. That is when switched into either D1 or D2 state they remain as switched for some seconds or even hours, depending on the cell material and construction, without any applied voltage until switched to the other state. This means that much larger numbers of intersections can be addressed without flicker of the display. Alternatively instead of refreshing the whole display only those parts to be changed are addressed.

Materials suitable for use in cells of this invention are:

EXAMPLE 1

CM6=43.5% CD3 (chiral component)+56.5% H1 (S host)
where CD3=22% CC1+78% CC3

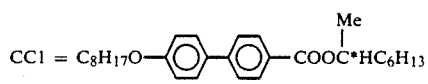

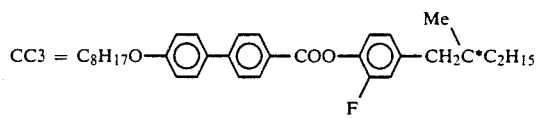

H1 = M1 + M2 + M3 (1:1:1)

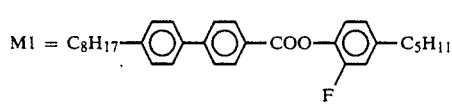

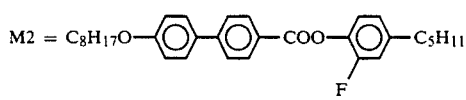

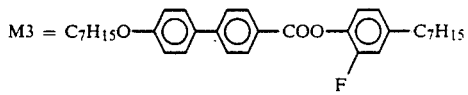

CM6 has the following phases solid⇌chiral smectic⇌smectic A⇌cholesteric⇌isotropic

EXAMPLE 2

Merck ZLI 3041

EXAMPLE 3

LPM13: 72.5% H1+25% M7+2.5% CC13

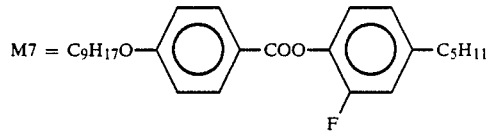

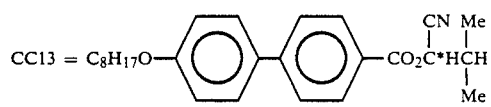

LLM13 has the following phases: solid, chiral smectic 56.3° cholesteric 118° isotropic.

Ps=10nC/cm² at 20° C. and 5nC/cm² at 46° C.

One example of a blue dye is D102 available from BDH Poole, Dorset, UK.

I claim:

1. A liquid crystal device comprising:
   two cell walls spaced apart by a spacer;
   a layer of a ferro electric smectic liquid crystal material contained between the walls, said liquid crystal material having a cholesteric phase at a temperature above ambient between the smectic and isotropic phases;
   electrode structures on the inner facing surfaces of the cell walls;
   a surface alignment coating on the inner facing surface of the walls, the alignment coating providing both an alignment direction and a surface tilt of above 5° to contacting liquid crystal material;
   at least one polarizer arranged with its optical axis parallel to a liquid crystal molecular alignment direction; and
   an amount of dichroic dye in the liquid crystal material sufficient to establish a guest-host type display device.

2. The device of claim 1 wherein the liquid crystal material has the following phases:

solid⇌chiral smectic⇌smectic A⇌cholesteric⇌isotropic.

3. The device of claim 1 wherein the two alignment directions of the surface alignment coatings are parallel but opposite.

4. The device of claim 1 wherein the two alignment directions of the surface alignment coatings are parallel and in the same direction.

5. The device of claim 1 wherein the surface tilt is in the range 10° to 45°.

6. The device of claim 1 wherein the liquid crystal material has a net spontaneous polarisation coefficient of greater than 0.1 nC/cm$^2$.

7. The device of claim 1 wherein the liquid crystal material has a net spontaneous polarisation coefficient of greater than 1.0 nc/cm$^2$.

8. The device of claim 1 wherein the liquid crystal material has a ferro electric smectic phase over an operating temperature range up to 100° C.

9. The device of claim 1 wherein the liquid crystal material has a ferro electric smectic phase over an operating temperature range up to 40° C.

10. The device of claim 1 wherein the layer of liquid crystal material is up to 15 μm thick.

11. The device of claim 1 wherein the electrodes are patterned into strip electrodes forming an x, y matrix array.

12. The device of claim 1 wherein the electrodes are patterned into strip electrodes forming an r, O matrix array.

13. The device of claim 11 and further comprising driver circuits for addressing the matrix array.

14. The device of claim 1 wherein the electrodes are patterned into segments for displaying numerical values.

15. The device of claim 1 wherein an at least partially reflecting mirror is arranged behind the device to reflect light back through the liquid crystal material and polariser.

16. The device of claim 1 further including a retarder plate.

17. A liquid crystal device comprising:
two cell walls spaced apart by a spacer;
a layer of a ferro electric smectic liquid crystal material contained between the walls, said liquid crystal material having a cholesteric phase at a temperature above ambient between the smectic and isotropic phases;
electrode structures on the inner facing surfaces of the cell walls;
a surface alignment coating on the inner facing surface of the walls, the alignment coating providing both an alignment direction and a surface tilt of above 5° to contacting liquid crystal material;
at least one polariser arranged with its optical axis parallel to a liquid crystal molecular alignment direction; and
a second polariser arranged so that the cell walls are between said polarisers.

18. The device of claim 17 wherein the two polarisers are arranged with their optical axis orthogonal.

* * * * *